United States Patent
Kweon et al.

(12)

(10) Patent No.: US 6,252,033 B1
(45) Date of Patent: Jun. 26, 2001

(54) METHOD FOR THE PREPARATION OF POLYAMIC ACID AND POLYMIDE USEFUL FOR ADHESIVES

(75) Inventors: Jeong Min Kweon, Kyunggi-Do; Soon Sik Kim, Seoul; Kyeong Ho Chang, Seoul; Kyung Rok Lee, Seoul, all of (KR)

(73) Assignee: Saehan Industries Incorporation, Kyongsangbuk-Do (KR)

( * ) Notice: Subject to any disclaimer, the term of this patent is extended or adjusted under 35 U.S.C. 154(b) by 0 days.

(21) Appl. No.: 09/531,314

(22) Filed: Mar. 20, 2000

(51) Int. Cl.⁷ ................... C08G 73/10; C08G 69/26; C08G 77/04; C08L 79/08

(52) U.S. Cl. ............... 528/170; 528/26; 528/28; 528/33; 528/38; 528/125; 528/126; 528/128; 528/171; 528/172; 528/173; 528/174; 528/175; 528/176; 528/179; 528/183; 528/185; 528/188; 528/220; 528/229; 528/350; 528/351; 528/353; 525/420; 525/422; 525/431; 525/436

(58) Field of Search ................. 528/33, 38, 26, 528/28, 126, 125, 128, 171, 170, 172, 173, 174, 175, 176, 179, 183, 185, 188, 220, 229, 350, 353, 351; 525/420, 422, 436, 431

(56) References Cited

U.S. PATENT DOCUMENTS

| | | | |
|---|---|---|---|
| 5,094,919 | * | 3/1992 | Yamada et al. ........... 428/450 |
| 5,859,181 | * | 1/1999 | Zhao et al. ............... 528/353 |
| 5,942,592 | * | 8/1999 | Zhao et al. ............... 528/26 |
| 6,054,554 | * | 4/2000 | Choi et al. ............... 528/353 |

* cited by examiner

Primary Examiner—P. Hampton-Hightower
(74) Attorney, Agent, or Firm—Harrison & Egbert

(57) ABSTRACT

A method for preparing polyamic acid and polyimide, which is suitable for use in adhesives or adhesive tapes for electronic parts. The polymers have such three-dimensional molecular structures that a significant improvement can be brought about in solvent solubility, thermal resistance, mechanical properties, and adhesive properties onto various substrates. The polyamic acid is prepared by reacting at least one tetracarboxylic dianhydride, at least one aromatic diamine, at least one diamine with a siloxane structure, represented by the following general formula I, and at least one polyamino compound represented by the following general formula II or III. The polyamic acid is converted into polyimide through thermal or chemical imidization.

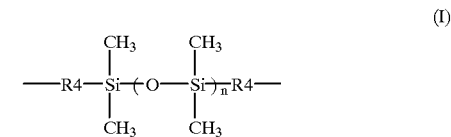

(I)

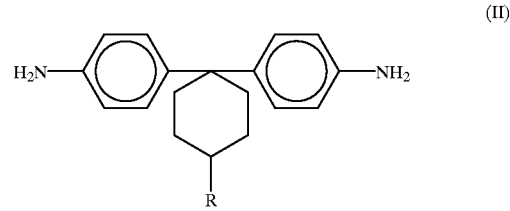

(II)

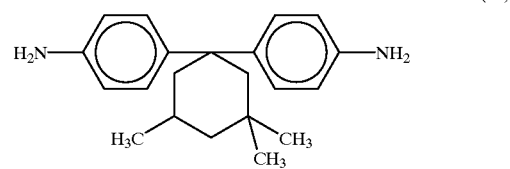

(III)

7 Claims, No Drawings

METHOD FOR THE PREPARATION OF POLYAMIC ACID AND POLYMIDE USEFUL FOR ADHESIVES

TECHNICAL FIELD

The present invention relates to a method for preparing polyamic acid, a precursor of polyimide, which is superior in thermal resistance and high-temperature adhesive properties and polyimide therefrom. More particularly, the present invention relates to a method for preparing three-dimensional molecular structures of polyamic acid and polyimide.

BACKGROUND ART

Polyimide is a high heat-resistant resin which is typically prepared by reacting dianhydride with diamine in an organic solvent and subjecting the resulting polyamic acid, a precursor of polyimide, to thermal or chemical imidization.

With excellent in thermal resistance, chemical resistance, electrical insulation, and mechanical properties, polyimide resins find numerous applications in the electric and electronic appliance, adhesive, composite material, fiber, and film industries.

By virtue of its linear backbone structure which allows chains to be packed at a high density and by virture the rigidity of the imide ring itself, polyimide can show superior thermal resistance. But, such structural features make it difficult for the polyimide to dissolve in solvents and to be melted by heating, so that the polyimide is poor in processability and adhesiveness to other materials.

Particularly, the polyimide which is specialized to be used in areas where high temperature stability is required, as in the production of films, has a linear backbone structure such that the packing density of polymer chains is high, largely determining the thermal resistance of the polyimide. Commercially available polyimide films, exemplified by Kapton and Upilex, typically exhibit such structures. Kapton is known to be prepared from pyromellitic dianhydride (PMDA) and oxydianiline (ODA) monomers while Upilex can be prepared from 3,3',4,4'-biphenyltetracarboxylic acid dianhydride (BPDA) and para-phenylenediamine (PPD) monomers. Also, it is known that a polyimide resin which is of higher thermal resistance can be obtained from a combination of PMDA and PPD monomers. However, very high rigidity and chain packing density of these polyimide resins brings about a bad effect upon their processability, flowability at high temperatures and adhesive properties.

To improve such problems, many attempts have been made, including introduction of polar groups into polymer backbones or side chains, introduction of bulky linking groups or side chains into backbones, and improvement of polymer backbone flexibility.

An improvement in the solubility of polyimide resins can be found in *Macromolecules,* 1994, 27, 1117, by Kurosaki et al., in which alicyclic acid anhydride is used as a monomer to prepare a soluble polyimide coating solution. Cyclic diamine is also used to prepare a soluble polyimide as disclosed in *Polymer Chem. Ed.,* 1993, 31, 2345–2351, by Qin Jin et al. However, most of the soluble polyimides modified in these manners suffer from a difficulty in practical use because they have significantly degraded thermal stability and mechanical properties.

In order to improve the solubility and adhesiveness properties of polyimide, there was suggested the introduction of siloxane structures of diamine compounds into polymer backbones as in U.S. Pat. Nos. 5,859,181, 5,942,592 and 5,094,919. No matter how improved it is, the solubility property resulting from the introduction of siloxane structures of diamine compounds falls within the scope of the conventional polyimide films. In addition, the presence of a great amount of the siloxane structures in the polymer deteriorates the thermal resistance and mechanical properties of the polymer. It is also difficult to introduce a great amount of the siloxane structures into the polymer.

SUMMARY OF THE INVENTION

Therefore, it is an object of the present invention to overcome the above problems encountered in prior art and to provide a method for preparing polyamic acid and polyimide, which both have such three-dimensional molecular structures that a significant improvement can be brought about in solvent solubility, thermal resistance, mechanical properties, and adhesive properties onto various substrates, thereby making the polymers suitable for use in adhesives or adhesive tapes for electronic parts.

Based on the present invention, the above object may be accomplished by a provision of a method for preparing polyamic acid and polyimide, which comprises reacting a mixture containing: at least one tetracarboxylic dianhydride; at least one aromatic diamine; at least one diamine with a siloxane structure, represented by the following general formula I:

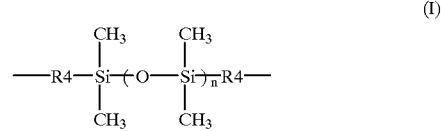

(I)

wherein R4 is an alkylene group containing 1–20 carbon atoms and n' is the number of a recurring unit from 1 to 20; and at least one alkyl or aryl cyclohexylidene dianiline represented by the following general formula II or III:

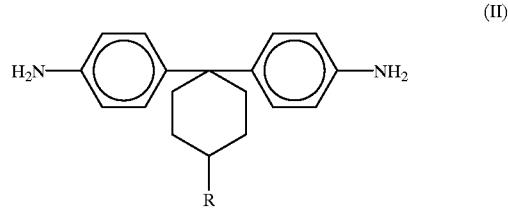

(II)

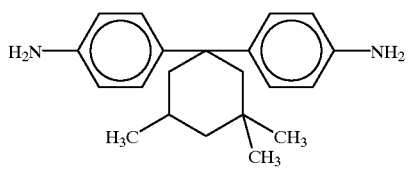

(III)

wherein R represents —CH₃, —CH₂CH₃, —C(CH₃)₂(CH₂CH₃), or a phenyl group.

DETAILED DESCRIPTION OF THE INVENTION

Having advantages over a linear molecular structure of polyimide in terms of physical properties, including thermal resistance, mechanical properties, adhesive properties and the like, a three-dimensional molecular structure of polyamic acid or polyimide is prepared by employing a siloxane structure of diamine and an alkyl or acyl cyclohexylidene dianiline compound, along with conventionally used aromatic diamine.

As typical examples, the tetracarboxylic dianhydride useful in the present invention is referred to compounds of the following general formula IV:

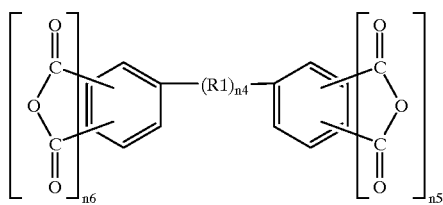

(IV)

wherein R1 represents —O—, —CO—, —SO₂—, —C(CF₃)₂—, an alkylene group, an alkylene bicarbonyl group, a phenylene group, a phenylene alkylene group, or a phenylene dialkylene group; n4 is 0 or 1; and n5 is 0 or 1 and n6 is 1 or 2 under the condition that n5+n6=2.

Concrete examples of the aromatic tetracarboxylic dianhydrides of the general formula IV include pyromellitic dianhydride, 3,3',4,4'-benzophenonetetracarboxylic dianhydride, 3,3',4,4'-biphenylic dianhydride, 2,3,3',4'-biphenyltetracarboxylic dianhydride, 2,2',6,6'-biphenyltetracarboxylic dianhydride, 2,3,6,7-naphthalenetetracarboxylic dianhydride, 1,2,5,6-naphthalenetetracarboxylic dianhydride, 2,2-bis(3,4-dicarboxyphenyl)propane dianhydride, bis(3,4-dicarboxyphenyl)sulfone dianhydride, bis(3,4-dicarboxyphenyl)ether dianhydride, 3,4,9,10-phenylenetetracarboxylic dianhydride, naphthalene-1,2,4,5-tetracarboxylic dianhydride, naphthalene-1,4,5,8-tetracarboxylic dianhydride, benzene-1,2,3,4-tetracarboxylic dianhydride, and ethylene glycol bis (anhydromellitate). These compounds may be used alone or in combinations.

In addition to the above-mentioned aromatic tetracarboxylic dianhydride, aliphatic or alicyclic structures of tetracarboxylic acid may be used within such a range that the polyamic acid or polyimide to be synthesized would not have a deteriorated thermal resistance.

Examples of such aliphatic or alicyclic structures of tetracarboxylic acid include 5-(2,5-diorthotetrahydrol)-3methyl-3-cyclohexane-1,2-dicarboxylic anhdride, 4-(2,5-diorthotetrahydrofuran-3-yl)tetralin-1,2-dicarboxylic anhydride, but-cyclo(2,2,2)-7-en-2,3,5,6-tetracarboxy dianhydride, and 1,2,3,4-cyclopentane tetracarboxy dianhydride and these compounds may be used alone or in combinations.

Concrete examples of the aromatic diamine useful in the present invention include 3,3'-diaminobiphenyl, 3,4'-diaminobiphenyl, 4,4'-diaminobiphenyl, 3,3' diaminodiphenylmethane, 3,4' diaminodiphenylmethane, 4,4'-diaminodiphenylmethane, 2,2-(3,3'-diaminodiphenyl)propane, 2,2-(3,4'-diaminodiphenyl)propane, 2,2-(4,4'-diaminodiphenyl)propane, 2,2-(3,3'-diaminodiphenyl)hexafluoropropane, 2,2-(3,4'-diaminodiphenyl)hexafluoropropane, 2,2-(4,4'-diaminodiphenyl)hexafluoropropane, 3,3'-oxydianiline, 3,4'-oxydianiline, 4,4'-oxydianiline, 3,3'-diaminodiphenylsulfide, 3,4'-diaminodiphenylsulfide, 4,4'-diaminodiphenylsulfide, 3,3'-diaminodiphenylsulfone, 3,4'-diaminodiphenylsulfone, 4,4'-diaminodiphenylsulfone, 1,3-bis[1-(3-aminophenyl)-1-mehylamine]benzene, 1,3-bis[1-(4-aminophenyl)-1-methylamine]benzene, 1,4-bis[1-(3-aminophenyl)-1-methylamine]benzene, 1,4-bis[1-(4-aminophenyl)-1-methylamine]benzene, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 3,3'-bis(3-aminophenoxy)diphenylether, 3,3'-bis(4-aminophenoxy)diphenylether, 3,4'-bis(3-aminophenoxy)diphenylether, 3,4'-bis(4-aminophenoxy)diphenylether, 4,4'-bis(3-aminophenoxy)diphenylether, 4,4'-bis(4-aminophenoxy)diphenylether, 3,3'-bis(3-aminophenoxy)biphenyl, 3,3'-bis(4-aminophenoxy)biphenyl, 3,4'-bis(3-aminophenoxy)biphenyl, 3,4'-bis(4-aminophenoxy)biphenyl, 3,3'-bis(3-aminophenoxy)biphenyl, 4,4'-bis(3-aminophenoxy)biphenyl, 4,4'-bis(4-aminophenoxy)biphenyl, 2,2-bis[4-(3-aminophenoxy)phenyl]sulfone, 2,2-bis[4-(4-aminophenoxy)phenyl]sulfone, 2,2-bis[3-(3-aminophenoxy)phenyl]propane, 2,2-bis[3-(4-aminophenoxy)phenyl]propane, 2,2-bis[4-(3-aminophenoxy)phenyl]propane, 2,2-bis[4-(4-aminophenoxy)phenyl]propane, 2,2-bis[3-(3-aminophenoxy)phenyl]hexafluoropropane, 2,2-bis[4-(3-aminophenoxy)phenyl]hexafluoropropane, 2,2-bis[4-(4-aminophenoxy)phenyl]hexafluoropropane, 9,9-bis(3-aminophenyl)fluorine, 9,9-bis(4-aminophenyl)fluorine, 3,3'-dimethyl-4,4'-diaminobiphenyl, 2,2'-bis(trifluoromethyl)benzidine, 2,2-bis[4-(4-amino-2-trifluorophenoxy)phenyl]hexafluoropropane, 1,2-phenylenediamine, 1,3-phenylenediamine, and 1,4-phenylenediamine. The above-mentioned compounds may be used, singly or as a mixture of at least two species.

Being introduced into the polymer, the alkyl or aryl cyclohexylidene dianiline represented by the general structure II or III provides bulky pendant groups for the backbone so as to afford excellent thermal resistance and to ameliorate the adhesive property with substrates.

Diamines with a siloxane structure represented by the general formula I may be exemplified by bis(γ-aminopropyl) tetramethyldisiloxane (GAPD, n=1), bis(γ-aminopropyl)

polydimethyldisiloxane (PSX-4, n=4) and bis(γ-aminopropyl)polydimethyldisiloxane (PSX-8, n=8) and these compounds may be used singly or as a mixture of at least two species.

By providing flexibility to the rigid structure of polyimide, the siloxane structure plays an important role in improving the adhesiveness of the polyamic acids and contributes to the solubility in solvents to increase the content of reactants in organic solvents. In addition, where the polymer is used as an adhesive material, the siloxane structure of diamine also improves the adhesive properties thereof on various substrates, especially in electronic areas, such as silicon chips, insulating layers on chips, lead frames, etc.

Available solvents for the synthesis of polyimide from aromatic tetracarboxylic dianhydrides and diamines are aprotic polar solvents such as N-methyl-2-pyrrolidone (NMP), N,N-dimethyl formamide (DMF), N,N-dimethylacetamide (DMAc), dimethylsulfoxide (DMSO), sulforan, hexamethylphosphate triamide, and 1,3-dimethyl-2-imidazolidone, and phenolic solvents such as phenol, cresol, xylphenol, and p-chlorophenol. If necessary, ethereal solvents such as diethylene glycol and dimethyl ether, and aromatic solvents such as benzene, toluene and xylene may be used for the synthesis of polyimide from aromatic tetracarboxylic dianhydride and diamine. Besides, methylethyl ketone, acetone, tetrahydrofuran, dioxnane, monoglyme, diglyme, methylcellosolve, cellosolveacetate, methanol, ethanol, isopropanol, methylene chloride, chloroform, trichloroethylene, and nitrobenzene are available.

A thermal imidization process, typical of the synthesis of polyimide, comprises coating a solution of a polyamic acid, a precursor of polyimide, and subjecting the coating to thermal treatment. For this, the precursor polyamic acid is prepared first. A mixture of the above-mentioned tetracarboxylic dianhydride and diamines in a solvent is allowed to undergo reaction in a nitrogen atmosphere at a temperature of −10 to 100° C. with vigorous stirring to give the precursor polyamic acid. Preferably, the reaction is continued for 10 hours and more preferably, 5 hours.

Conversion of the polyamic acid to a polyimide can be achieved by coating the polyamic acid and heating it up to a temperature of 250–500° C. To enhance the imidization during the dryness of the coating, a tertiary amine, such as pyridine, triethyl amine, tributyl amine, and isoquinoline, an acid anhydride such as acetic anhydride, propionic anhydride and benzoic anhydride, a dehydrating and ring-closing agent, and/or a ring closing catalyst may be added to a solution of the polyamic acid.

As mentioned earlier, a chemical imidization process may be completed to convert polyamic acid into polyimide. When the polyimide from tetracarboxylic dianhydride and diamine is soluble in organic solutions, a solution of the reactants in a solvent is directly heated at greater than 100° C. and preferably at greater than 180° C. in the presence of a catalyst, such as tributyl amine, triethyl amine, triphenyl phosphite, isoquinoline, and pyridine or in the presence of a dehydrating catalyst such as p-toluene sulfonic acid, to afford polyimide. Alternatively, tetracarboxylic acid-2-anhydride and diamine are reacted at less than 100° C. in an organic solvent to yield polyamic acid, followed by subjecting the polyamic acid to ring closure at a relatively low temperature from room temperature to 100° C. in the presence of a dehydrating and ring-closing agent selected from acid anhydrides, such as acetic anhydride, propionic anhydride and benzoic anhydride, and carbodiimide compounds, such as dicyclohexylcarbodiimide, optionally along with a ring closing catalyst such as pyridine, isoquinoline, imidazole and triethylemine.

Upon the synthesis of polyimide, better reaction can be obtained with a restrained amount for each component used. A preferable amount of the diamine compound with the siloxane structure of the general formula I is within a range of 0.1 to 50 mol % of the total diamines used. For example, when the diamine is used at an amount of less than 0.1 mol %, poor solubility and adhesiveness result. On the other hand, more than 50 mol % of the diamine brings about an improvement in adhesive property, but makes it difficult to increase the polymerization degree.

As for the alkyl or aryl cyclohexylidene dianiline represented by the general formula II or III, its amount ranges preferably from 0.01 to 40 mol % of the total diamine used. When using the alkyl or aryl cyclohexylidene dianiline at less than 0.01 mol %, the polymer is improved in thermal resistance, but becomes poor in solubility. On the other hand, more than 40 mol % of the alkyl or aryl cyclohexylidene dianiline results in improving the solubility, but deteriorating the thermal resistance and increasing the cost of the polymer.

Adhesive tapes for electronic parts are largely to form bonds between semiconductor assemblies along the lead frame and at its vicinities, for example, lead pins, paddles to mount semiconductor chips, heat sinks, semiconductor chips, etc. and also, they can be used where a large adhesive strength with thin copper films is required, like bilayer adhesive tapes for a flexible printed circuit (FPC) substrate of structures and for tape automated bonding (TAB) As examples of adhesive tapes for use in electronic parts, there exist adhesive tapes for fixing lead frames, adhesive tapes for bonding between lead frames and semiconductor chips, and adhesive tapes for use in lead frame die pads. As a rule, such adhesive tapes are required to have good processability upon taping as well as guarantee the stability during semiconductor assembling processes subsequent to the taping and the semiconductor package reliability.

Particularly for semiconductor assembling, adhesives are required to be of high adhesiveness in a high-temperature taping process as well as to be of high thermal stability in subsequent processes, such as wire bonding and epoxy molding. Generally, in order to enhance its flowability and adhesive property in a high-temperature taping process, polyimide is made to be decreased in glass transition temperature and melting temperature. However, its lessened thermal stability does not guarantee the subsequent high-temperature processes, such as wire bonding and epoxy molding. In contrast, the three-dimensional network molecular structure of polyimide according to the present invention shows excellent flowability at high temperatures without decreasing in glass transition temperature. Thus, after bonding, the adhesive of the present invention retains excellent adhesive property and thermal stability of the adhesive even in subsequent high-temperature processes, such as wire bonding and epoxy molding, to guarantee the semiconductor package reliability.

A polyimide adhesive tape may be prepared by applying the polyimide of the present invention on one surface or both surfaces of a base film. In this regard, a solution of a polyimide-based adhesive is coated on one surface or both surfaces of a base film at such a thickness that the final adhesive polymer layer usually ranges in thickness from 1 to 150 $\mu$m and preferably 5 to 50 $\mu$m, followed by drying. Suitable for the base film are thermal resistance films, examples of which include thermal resistance resin films such as polyimide films, polyvinylene sulfide films, polyether films, polyethylene terephthalate films, fluorine-based films, and composite thermal resistance films such as epoxy-glass cloth and epoxy-polyimide-glass cloth, with special preference to polyimide films. A preferable thickness of the thermal resistance film falls within the range of 5 to 150 $\mu$m. Particularly where being used in adhesive tapes for LOC, there is usually employed a polyimide film 25 $\mu$m or 50 $\mu$m thick. In order to enhance the adhesive strength between the polyimide adhesive and the base film, a treatment with plasma, corona, or chemical agents, such as silane, is carried out on the base film. Also, the base film may be treated with a silicon-based releasing agent to produce an adhesive sheet comprising only a polyimide layer as an adhesive layer. For use, this releasable film ranges, in thickners, from 1 to 200 $\mu$m.

By virtue of superiority in both thermal resistance and mechanical strength, the polyamic acid or polyimide prepared according to the present invention can be used as a material for thermal resistance films.

A better understanding of the present invention may be obtained in light of the following examples which are set forth to illustrate, but are not to be construed to limit the present invention.

EXAMPLE I

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of trimethyl-cyclohexylidene dianiline, and 1.45 g (0.00585 moles) of bis(3-aminopropyl)tetramethyldisiloxane were first introduced and dissolved at 15° C., followed by the addition of 10.74 g (0.03 moles) of 3,3',4,4'-diphenylsulfone tetracarboxylic dianhydride. The resulting reaction solution was allowed to react for 5 hours in a nitrogen atmosphere to vigorous agitation to yield polyamic acid.

The polyamic acid was added with 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE II

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of trimethyl-cyclohexylidene dianiline, and 1.45 g (0.00585 moles) of bis(3-aminopropyl)tetramethyldisiloxane were first introduced and dissolved at 15° C., followed by the addition of 6.54 g (0.03 moles) of pyromellitic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE III

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of trimethyl-cyclohexylidene dianiline, and 1.45 g (0.00585 moles) of bis(3-aminopropyl)tetramethyldisiloxane were first introduced and dissolved at 15° C., followed by the addition of 9.30 g (0.03 moles) of 3,3',4,4'-oxydiphthalic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE IV

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of trimethyl-cyclohexylidene dianiline, and 1.45 g (0.00585 moles) of bis(3-aminopropyl)tetramethyldisiloxane were first introduced and dissolved at 15° C., followed by the addition of 8.82 g (0.03 moles) of 3,3',4,4'-biphenyltetracarboxylic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE V

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of trimethylcyclohexylidene dianiline, and 1.45 g (0.00585 moles) of bis(3-aminopropyl)tetramethyldisiloxane were first introduced and dissolved at 15° C., followed by the addition of 8.82 g (0.03 moles) of hexafluorotetracarboxylic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE VI

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 3.91 g (0.014 moles) of 4-methylcyclohexylidene dianiline, and 1.45 g (0.00585 moles) of bis(3-aminopropyl)tetramethyldisiloxane were first introduced and dissolved at 15° C., followed by the addition of 10.74 g (0.03 moles) of 3,3',4,4'-benzophenonetetracarboxylic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE VII

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 3.91 g (0.014 moles) of 4-methylcyclohexylidene dianiline, and 1.45 g (0.00585 moles) of bis(3-aminopropyl)tetramethyldisiloxane were first introduced and dissolved at 15° C., followed by the addition of 6.54 g (0.03 moles) of pyromellitic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

EXAMPLE VIII

In a reaction vessel equipped with an agitator, a reflux condenser, and a nitrogen inlet, containing 173.07 g of N-methyl-2-pyrrolidone (NMP) as a solvent, 2.8 g (0.014 moles) of oxydianiline, 4.31 g (0.014 moles) of 4-methylcyclohexylidene dianiline, and 1.45 g (0.00585 moles) of bis(3-aminopropyl)tetramethyldisiloxane were first introduced and dissolved at 15° C., followed by the addition of 9.30 g (0.03 moles) of 3,3',4,4'-oxydiphthalic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

Comparative Example I

In a reaction vessel equipped with an agitator, a reflux condenser, and a nitrogen inlet, containing 157.59 g of N-methyl-2-pyrrolidone (NMP) as a solvent, 6.0 g (0.03 moles) of oxydianiline was first introduced and dissolved at 15° C., followed by the addition of 10.74 g (0.03 moles) of 3,3',4,4'-benzophenonetetracarboxylic dianhydride. The resulting reaction solution was allowed to react for 5 hours in a nitrogen atmosphere with vigorous agitation to yield polyamic acid.

Comparative Example II

In a reaction vessel equipped with an agitator, a reflux condenser, and a nitrogen inlet, containing 157.59 g of N-methyl-2-pyrrolidone (NMP) as a solvent, 6.0 g (0.03 moles) of oxydianiline was first introduced and dissolved at 15° C., followed by the addition of 6.54 g (0.03 moles) of pyromellitic dianhydride. The resulting reaction solution was allowed to react for 5 hours in a nitrogen atmosphere with vigorous agitation to yield polyamic acid.

Comparative Example III

In a reaction vessel equipped with an agitator, a reflux condenser, and a nitrogen inlet, containing 173.07 g of N-methyl-2-pyrrolidone (NMP) as a solvent, 6.16 g (0.02 moles) of trimethylcyclohexylidene dianiline, and 2.92 g (0.01 mole) of 1,3-bis(4-aminophenoxy)benzene were first introduced and dissolved at 15° C., followed by the addition of 8.58 g (0.03 moles) of 3,3',4,4'-oxydiphthalic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

Comparative Example IV

In a reaction vessel equipped with an agitator, a reflux condenser, and a nitrogen inlet, containing 173.07 g of N-methyl-2-pyrrolidone (NMP) as a solvent, 5.84 g (0.02 moles) of 1,3-bis(4-aminophenoxy)benzene and 2.48 g (0.01 mole) of bis(3-aminopropyl)tetramethyldisiloxane were first introduced and dissolved at 15° C., followed by the addition of 10.74 g (0.03 moles) of 3,3',4,4'-benzophenonetetracarboxylic dianhydride. The resulting reaction solution was allowed to react for 5 hours in a nitrogen atmosphere with vigorous agitation to yield polyamic acid.

The polyamic acid was added to 50 ml of toluene and 3.0 g of p-toluene sulfonic acid and heated at 190° C., after which imidization was performed for 6 hours while moisture was removed from the reaction solution in dependence on the reaction progress. Thereafter, the polyimide solution was added to methanol for precipitation. The precipitates thus formed were separated, ground and dried to give polyimide powder. In IR spectra from the polyimides, absorption peaks were read at 1718 cm$^{-1}$ and 1783 cm$^{-1}$, which are typical for the imide group.

The polyamic acids prepared in Examples I to VIII and Comparative Examples I to IV were measured for relative viscosity (the polyamic acids were diluted to a concentration of 0.05 wt % in N,N-dimethyl acetamide) and the results are given in Table 1, below.

Using a knife coater, the polyamic acid varnishes obtained in the above Examples and Comparative Examples were coated on glass plates, respectively, followed by drying them for 60 min at 80° C. in a vacuum drier to produce films. After being peeled off of the glass plates, the films were dried at 150° C. for 5 min and further at 200° C. for 5 min, and finally subjected to thermal imidization at 300° C. for 1 hour to afford polyimide films 50 μm thick.

To examine the thermal properties of the obtained films, their 5% weight loss temperatures were measured with a thermo gravimeter and the glass transition temperatures were measured with a differential scanning calorimeter. For mechanical strength examination, the films were measured for elastic modulus at room temperature and for tensile strength at break. The results are given in Table 1, below.

TABLE 1

| Nos. of Exmpl. | Relative Viscosity (dl/g) | 5% Wt Loss Temp. | Tg (° C.) | Tensile Strength (Kgf/mm$^2$) | Elastic Modulus (Kgf/mm$^2$) |
|---|---|---|---|---|---|
| I | 2.35 | 573 | 305 | 10.8 | 500 |
| II | 2.52 | 568 | 342 | 13.5 | 400 |
| III | 2.13 | 564 | 290 | 11.5 | 480 |
| IV | 2.40 | 582 | 283 | 10.9 | 440 |
| V | 1.84 | 560 | 310 | 12.6 | 430 |
| VI | 1.73 | 531 | 276 | 11.9 | 425 |
| VII | 2.68 | 574 | 265 | 10.3 | 395 |
| VIII | 2.27 | 581 | 265 | 10.3 | 395 |
| C.I | 1.55 | 593 | 269 | 13.4 | 540 |
| C.II | 1.92 | 557 | 249 | 15.3 | 430 |
| C.III | 1.74 | 557 | 246 | 10.1 | 320 |
| C.IV | 1.24 | 485 | 247 | 5.4 | 173 |

The above polyimide solutions obtained in Examples I to VIII and Comparative Examples III and IV and the polyamic acids obtained in Comparative Examples I and II (the polyimides obtained through the imidization of the polyamic acids were insoluble in solvents) were coated on Upilex-S films with the aid of a knife coater. The polyimide solutions were dried for 30 min at 230° C. while the polyamic acids are dried for ten min at 80° C., 110° C., 150° C. and 200° C., respectively, and finally subjected to thermal imidization for one hour at 300° C. to produce adhesive tapes, each having an adhesive layer 20 μm thick. After being bonded onto a copper plate, an NiFe alloy plate and a PIX-3000 (Hitachi Chemical Co.) coated plate at 400° C. at a pressure of 10 Kg/cm$^2$, the adhesive tapes were tested for the T-peel strength while they were pulled at a rate of 50 mm/min at room temperature. The results are also given in Table 2, below.

TABLE 2

| Nos. of Exmpl. | Solubility* | | | | Active Strength (kg/cm) | | |
|---|---|---|---|---|---|---|---|
| | NMP | DMAc | DMF | DMSO | Cu | NiFe | PIX-3000 |
| I | ⊙ | ⊙ | ⊙ | ⊙ | 1.30 | 1.40 | 1.35 |
| II | ⊙ | ⊙ | ⊙ | ⊙ | 1.35 | 1.50 | 1.45 |
| III | ⊙ | ⊙ | ⊙ | ⊙ | 1.10 | 1.24 | 1.20 |
| IV | ⊙ | ⊙ | ⊙ | ⊙ | 1.10 | 1.54 | 1.15 |
| V | ⊙ | ⊙ | ⊙ | ⊙ | 1.50 | 1.21 | 1.24 |
| VI | ⊙ | ⊙ | ⊙ | ⊙ | 1.10 | 1.12 | 1.34 |
| VII | ⊙ | ⊙ | ⊙ | ⊙ | 1.97 | 1.78 | 1.49 |
| VIII | ⊙ | ⊙ | ⊙ | ⊙ | 2.12 | 1.79 | 1.49 |
| C.I | x | X | x | X | 0.25 | 0.30 | 0.20 |
| C.II | x | x | x | X | 0.47 | 0.57 | 0.40 |
| C.III | ⊙ | ⊙ | ⊙ | ⊙ | 0.42 | 0.29 | 0.27 |
| C.IV | ⊙ | ⊙ | x | X | 1.94 | 1.75 | 1.49 |

NMP: N-methyl-2-pyrrolidone, DMAc: N,N-dimethylacetamide
DMF: N,N-dimethylformamid, DMSO: dimethylsulfoxide
⊙: completely soluble, x: completely insoluble As apparent from the data obtained in the above Examples and Comparative Examples, the polyamic acid and polyimide prepared according to the present invention are superior in adhesive strength and high-temperature stability while maintaining their inherent thermal resistance and mechanical properties, and thus can be effectively used as an adhesive material for high temperature adhesive tapes suitable for semiconductor assembly.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for the preparation of polyamic acid, which comprises reacting a mixture containing:
   at least one tetracarboxylic dianhydride;
   at least one aromatic diamine;
   at least one diamine with a siloxane structure, represented by the following general formula I:

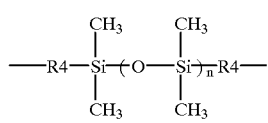
(I)

wherein R4 is an alkylene group containing 1–20 carbon atoms and n' is the number of a recurring unit from 1 to 20; and
   at least one alkyl or aryl cyclohexylidene dianiline represented by the following general formula II or III:

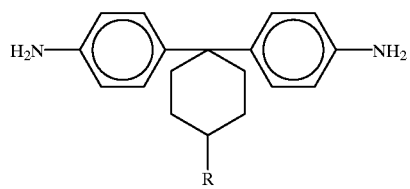
(II)

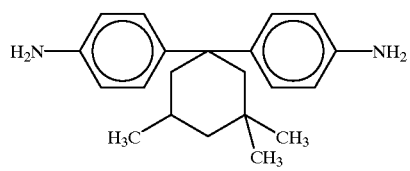
(III)

wherein R represents —$CH_3$, —$CH_2CH_3$, —$C(CH_3)_2$($CH_2CH_3$), or a phenyl group.

2. A method for the preparation of polyimide, which comprises the steps of:
   reacting a mixture containing at least one tetracarboxylic dianhydride; at least one aromatic diamine; at least one diamine with a siloxane structure, represented by the following general formula I:

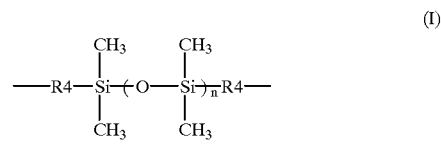
(I)

wherein R4 is an alkylene group containing 1–20 carbon atoms and n' is the number of a recurring unit from 1 to 20; and at least one polyamino compound represented by the following general formula II or III:

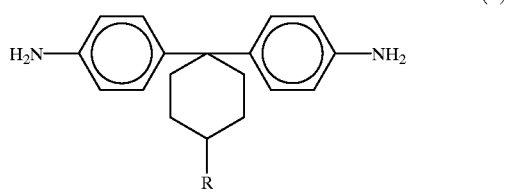
(II)

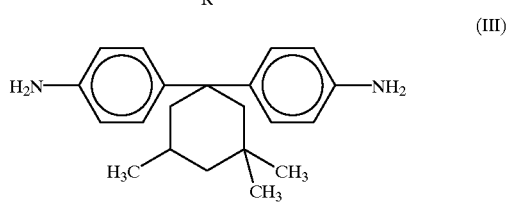
(III)

wherein R represents —$CH_3$, —$CH_2CH_3$, —$C(CH_3)_2$($CH_2CH_3$), or a phenyl group; and
   thermally or chemically imidizing the polyamic acid.

3. A method as claimed in claim 2, wherein the thermally imidizing step is carried out at 250–500° C.

4. A method as claimed in claim 1, wherein the chemically imidizing step is carried out at room temperature to 100° C. in the presence of a dehydrating and ring-closing agent.

5. A method as claimed in claim 4, wherein the dehydrating and ring-closing agent is selected from the group consisting of acetic anhydride, propionic anhydride, benzoic anhydride, and dicyclohexylcarbodiamide.

6. A method as claimed in claim 1, wherein the diamine compound with the siloxane structure of the general formula I is used at an amount of 0.1 to 50 mol % of the total diamines used.

7. A method as claimed in claim 1, wherein the alkyl or aryl cyclohexylidene dianiline is used at an amount of 0.01–40 mol % of the total diamines used.

* * * * *